Feb. 2, 1926. 1,571,200
J. HARRIS
INDUCTION ELECTRICITY METER
Filed May 20, 1925
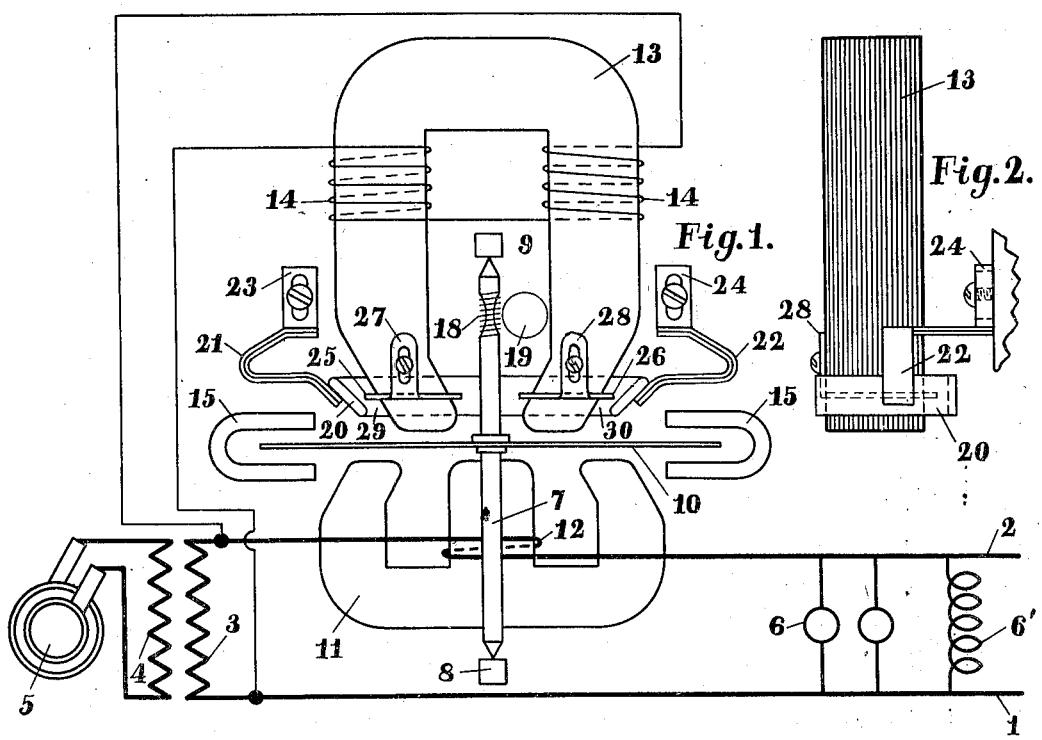
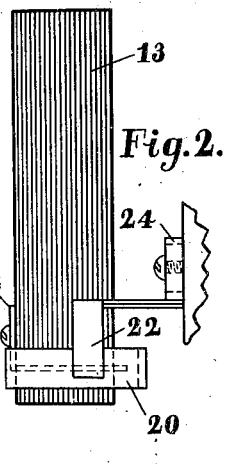
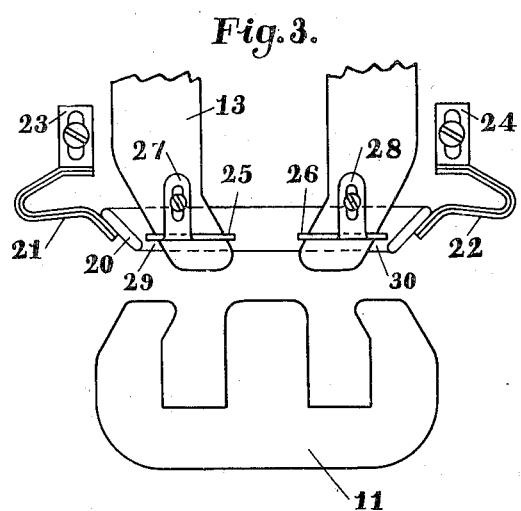
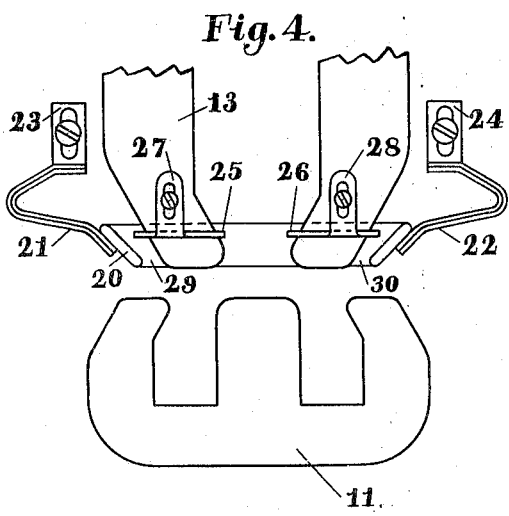
INVENTOR
Jesse Harris
BY
ATTORNEY Patented Feb. 2, 1926.

1,571,200

UNITED STATES PATENT OFFICE.

JESSE HARRIS, OF LA FAYETTE, INDIANA, ASSIGNOR TO DUNCAN MANUFACTURING COMPANY, OF LA FAYETTE, INDIANA, A CORPORATION OF ILLINOIS.

INDUCTION ELECTRICITY METER.

Application filed May 20, 1925. Serial No. 31,551.

*To all whom it may concern:*

Be it known that I, JESSE HARRIS, a citizen of the United States, residing at La Fayette, in the county of Tippecanoe and the State of Indiana, have invented a certain new and useful Improvement in Induction Electricity Meters, of which the following is a full, clear, concise, and exact description.

My invention relates to rotating induction electricity meters and has for its prime object the provision of means for compensating for the temperature effected changes in the flux of the drag or damping magnets thereof. In accomplishing this result I also secure proper compensation for temperature effected changes in the pressure flux. In the preferred embodiment of the invention I also prevent changes in temperature from disturbing the phase relation between the current and pressure fields. Incidentally I also am enabled to compensate for minor temperature effected errors in induction meters, such as the variations in the armature air gap due to the linear contraction and expansion of the meters occurring upon change in temperature. In compensating for errors at the drag or damping magnet I employ a device responsive to temperature changes and so related to the produced torque effecting flux of the meter motor as to operate upon increase in temperature to limit a smaller proportion of this produced flux to passage through the motor armature and upon decrease in temperature as to permit a larger proportion of this produced flux to pass through the motor armature to an extent to compensate for the temperature effected changes in the dragging action of said magnet. In the preferred embodiment of the invention I employ an adjustable flux diverter of magnetizable material arranged in conjunction with the pressure winding to divert flux produced by the pressure winding from the armature, and a thermo-motive device in adjusting relation to said diverter and serving to move the diverter in a direction to increase the proportion of the produced pressure flux diverted by the diverter upon increase in temperature to reduce the proportion of this produced flux passing through the armature and to move the diverter in a direction to reduce the proportion of the produced pressure flux diverted by the diverter upon decrease in temperature to increase the proportion of this produced flux passing through the armature, sufficiently to effect the desired compensation.

The temperature effected changes in the amount of the produced pressure flux are in a direction to assist in the correction of the errors at the drag magnet, but do not proceed far enough. I therefore change the proportions of this produced pressure flux passing through the armature, as stated, and, in effect, augment the corrective tendencies in relation to the damping magnet that are inherent in the meter, but not excessively, as temperature effected changes in the quantity of this produced torque producing flux have also to be taken into consideration to maintain a proper balance between the meter torque and the drag of the damping magnet.

I will explain my invention more fully in connection with the accompanying drawing in which Fig. 1 is a diagrammatic view showing the usual circuits of an integrating watt hour meter and a meter in elevation, as this meter is preferably constructed; Fig. 2 is a side view of the meter; Fig. 3 is a view showing the compensating device in its least active position; and Fig. 4 shows the compensating device in its most active position.

I have illustrated transmission mains 1, 2 supplied from a suitable source of current, which, in an alternating current system of distribution, may be the secondary 3 whose primary 4 is shown as being supplied from an alternating current generating dynamo 5. The load illustrated is in the form of incandescent electric lamps 6 and an inductive load 6' bridged between the mains. The energy consumed by the load is measured by a watt meter, usually of the induction watt hour or integrating type, such a meter being illustrated in the drawing. This meter is inclusive of an upright spindle or shaft 7 suitably held in the bearings 8 and 9. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E shaped core of laminated iron 11 whose middle leg is wound by a coil 12 serially included in the main 2. The pressure magnet is inclusive of a U shaped core 13 whose legs are surrounded by the coils 14 which are connected in series in the same bridge between the distributing mains 1 and 2. The speed of the armature of the meter is checked by the permanent magnets 15 which embrace the peripheral portion of the disc. The meter parts illustrated and described constitute a meter motor whose armature 10 and spindle 7 turn proportionately to the wattage in a manner well known to those familiar with the art.

A worm 18 is provided upon the spindle 7 and is in mesh with a pinion 19 that is in driving relation with the counting train of the meter, as is well understood without the necessity of further illustration.

The hollow magnetic diverter 20 is supported by the thermostatic or thermo-motive strips 21 and 22 carried by the adjustable brackets 23, 24, this diverter embracing the converging tapering ends of the pressure core 13. The closed secondary conductors or coils 25, 26 surround the poles of core 13 and lag the flux of the pressure coils 14 in the usual way to bring the pressure flux into quadrature with the current flux. Brackets 27 and 28 support the conductors 25 and 26 and furnish means by which these conductors may be adjusted along the axes of the sides of the pressure core 13 to secure quadrature adjustment at a given temperature in the factory room where the calibration takes place. Tapered gaps 29, 30 are formed by and between the tapered outer side faces of the ends of the core 13 and the differently tapered inner faces of the magnetic diverter 20. These tapered gaps furnish a zone of flux of variable density therein, and as the lag coils or conductors 25, 26 are adjustable by means of bracket 27, 28 the relative activities of these conductors and the diverter 20 may be predetermined and the meter adjusted for change in the torque and the phase angle of the fluxes. As an example, assume a meter adjusted at room temperature to run correctly so as to register some definite unity power factor load with the lag coils 25, 26 so placed within the tapered gaps 29 and 30 that the activity of these coils will be such as to bring the potential or pressure coil flux into quadrature relation with the current coil flux.

Upon a rise in ambient temperature this balance will be disturbed, as less torque will be produced by the lessened primary flux of the pressure coil, while at the same time the drag of the permanent magnet 15 is lessened, and as this latter is the dominant effect, the torque is lessened still more to secure complete compensation for the defects arising at said magnets. To this end the diverter is raised by the thermo-motive device 21, 22, which are preferably thermostats, into a new position, where a new balance of flux is made and the density of all of the flux threading the closed conductor disc 10 is just sufficient to maintain the proper speed. This same movement of the diverter carries the variable zone of flux threading the gaps 29 and 30 across the lag coils 25 and 26 to an extent to increase the flux threaded by these coils and thereby increasing their activity to maintain the quadrature relation between the pressure and current fluxes. Opposite results occur when the temperature falls as will be apparent from the foregoing description and drawing.

Changes may be made without departing from my invention.

Having thus described my invention, I claim:

1. An electricity meter including a rotating induction motor having current and pressure windings in inductive relation to the motor armature and employing a closed metallic conductor upon the rotating element of the motor and a damping magnet in inductive relation to said closed metallic conductor; and a device responsive to temperature changes and related to the produced torque effecting flux of the motor and operating upon increase in temperature to limit a smaller proportion of this produced flux to passage through the motor armature and upon decrease in temperature to permit a larger proportion of this produced flux to pass through the motor armature, to compensate for temperature effected changes in the dragging action of said magnet.

2. An electricity meter including a rotating induction motor having current and pressure windings in inductive relation to the motor armature and employing a closed metallic conductor upon the rotating element of the motor and a damping magnet in inductive relation to said closed metallic conductor; a flux diverter of magnetizable material arranged in conjunction with the pressure winding to divert flux produced by the pressure winding from the armature; and a device responsive to change in temperature and serving to increase the proportion of the produced pressure flux diverted by the diverter upon increase in temperature to reduce the proportion of this produced flux passing through the armature and to reduce the proportion of the produced pressure flux diverted by the diverter upon decrease in temperature to increase the proportion of this produced flux passing through the armature, to compensate for temperature effected changes in the dragging action of the magnet.

3. An electricity meter including a rotating induction motor having current and pressure windings in inductive relation to the motor armature and employing a closed metallic conductor upon the rotating element of the motor and a damping magnet in inductive relation to said closed metallic conductor; an adjustable flux diverter of magnetizable material arranged in conjunction with the pressure winding to divert flux produced by the pressure winding from the armature; and a thermo-motive device in adjusting relation to said diverter and serving to move the diverter in a direction to increase the proportion of the produced pressure flux diverted by the diverter upon increase in temperature to reduce the proportion of this produced flux passing through the armature and to move the diverter in a direction to reduce the proportion of the produced pressure flux diverted by the diverter upon decrease in temperature to increase the proportion of this produced flux passing through the armature, to compensate for temperature effected changes in the dragging action of the magnet.

4. An electricity meter including a rotating induction motor having current and pressure windings in inductive relation to the motor armature and employing a closed metallic conductor upon the rotating element of the motor and a damping magnet in inductive relation to said closed metallic conductor; a device responsive to temperature changes and related to the produced torque effecting flux of the motor and operating upon increase in temperature to limit a smaller proportion of this produced flux to passage through the motor armature and upon decrease in temperature to permit a larger proportion of this produced flux to pass through the motor armature, to compensate for temperature effected changes in the dragging action of said magnet; and a conductor in secondary relation to the pressure winding for establishing phase relation between the current and pressure fields and positioned to have the flux therethrough varied by said device to maintain the phase relation between the current and pressure fields upon change in temperature.

5. An electricity meter including a rotating induction motor having current and pressure windings in inductive relation to the motor armature and employing a closed metallic conductor upon the rotating element of the motor and a damping magnet in inductive relation to said closed metallic conductor; a flux diverter of magnetizable material arranged in conjunction with the pressure winding to divert flux produced by the pressure winding from the armature; a device responsive to change in temperature and serving to increase the proportion of the produced pressure flux diverted by the diverter upon increase in temperature to reduce the proportion of this produced flux passing through the armature and to reduce the proportion of the produced pressure flux diverted by the diverter upon decrease in temperature to increase the proportion of this produced flux passing through the armature, to compensate for temperature effected changes in the dragging action of the magnet; and a conductor in secondary relation to the pressure winding for establishing phase relation between the current and pressure fields and positioned to have the flux therethrough varied by said diverter to maintain the phase relation between the current and pressure fields upon change in temperature.

6. An electricity meter including a rotating induction motor having current and pressure windings in inductive relation to the motor armature and employing a closed metallic conductor upon the rotating element of the motor and a damping magnet in inductive relation to said closed metallic conductor; an adjustable flux diverter of magnetizable material arranged in conjunction with the pressure winding to divert flux produced by the pressure winding from the armature; a thermo-motive device in adjusting relation to said diverter and serving to move the diverter in a direction to increase the proportion of the produced pressure flux diverted by the diverter upon increase in temperature to reduce the proportion of this produced flux passing through the armature and to move the diverter in a direction to reduce the proportion of the produced pressure flux diverted by the diverter upon decrease in temperature to increase the proportion of this produced flux passing through the armature, to compensate for temperature effected changes in the dragging action of the magnet; and a conductor in secondary relation to the pressure winding for establishing phase relation between the current and pressure fields and positioned to have the flux therethrough varied by said diverter to maintain the phase relation between the current and pressure fields upon change in temperature.

7. An electricity meter including a rotating induction motor having current and pressure windings in inductive relation to the motor armature and employing a closed metallic conductor upon the rotating element of the motor and a damping magnet in inductive relation to said closed metallic conductor; and a device responsive to temperature changes and related to the torque effecting flux of the motor and operating upon increase in temperature to reduce the flux and upon decrease in temperature to increase the flux, to compensate for temperature effected changes in the dragging action of said magnet.

8. An induction electricity meter including a torque producing magnet system having current and pressure windings, and a device responsive to changes in temperature for varying the reluctance encountered by flux set up by said magnet system and serving to reduce the torque effecting flux upon increase in temperature and to increase the torque effecting flux upon reduction in temperature.

9. An electricity meter including a rotating induction motor having a torque producing magnet system, provided with current and pressure windings in inductive relation to the motor armature and employing a closed metallic conductor upon the rotating element of the motor and a damping magnet in inductive relation to said closed conductor, and a device responsive to changes in temperature for varying the reluctance encountered by flux set up by said magnet system and serving to reduce the torque effecting flux upon increase in temperature and to increase the torque effecting flux upon reduction in temperature, to compensate for temperature effected changes in the dragging action of the damping magnet.

10. An induction electricity meter including a torque producing magnet system having current and pressure windings, and a device responsive to changes in temperature for varying the reluctance encountered by flux set up by said magnet system and flowing in a path that shunts the meter armature and serving to reduce the torque effecting flux upon increase in temperature and to increase the torque effecting flux upon reduction in temperature.

11. An electricity meter including a rotating induction motor having a torque producing magnet system provided with current and pressure windings in inductive relation to the motor armature and employing a closed metallic conductor upon the rotating element of the motor and a damping magnet in inductive relation to said closed conductor, and a device responsive to changes in temperature for varying the reluctance encountered by flux set up by said magnet system and flowing in a path that shunts the meter armature and serving to reduce the torque effecting flux upon increase in temperature and to increase the torque effecting flux upon reduction in temperature, to compensate for temperature effected changes in the dragging action of the damping magnet.

12. An induction electricity meter including a torque producing magnet system having current and pressure windings, and a thermo-motive device responsive to changes in temperature for varying the reluctance encountered by flux set up by said magnet system and serving to reduce the torque effecting flux upon increase in temperature and to increase the torque effecting flux upon reduction in temperature.

13. An electricity meter including a rotating induction motor having a torque producing magnet system, provided with current and pressure windings in inductive relation to the motor armature and employing a closed metallic conductor upon the rotating element of the motor and a damping magnet in inductive relation to said closed conductor, and a thermo-motive device responsive to changes in temperature for varying the reluctance encountered by flux set up by said magnet system and serving to reduce the torque effecting flux upon increase in temperature and to increase the torque effecting flux upon reduction in temperature, to compensate for temperature effected changes in the dragging action of the damping magnet.

14. An induction electricity meter including a torque producing magnet system having current and pressure windings, and a thermo-motive device responsive to changes in temperature for varying the reluctance encountered by flux set up by said magnet system and flowing in a path that shunts the meter armature and serving to reduce the torque effecting flux upon increase in temperature and to increase the torque effecting flux upon reduction in temperature.

15. An electricity meter including a rotating induction motor having a torque producing magnet system provided with current and pressure windings in inductive relation to the motor armature and employing a closed metallic conductor upon the rotating element of the motor and a damping magnet in inductive relation to said closed conductor, and a thermo-motive device responsive to changes in temperature for varying the reluctance encountered by flux set up by said magnet system and flowing in a path that shunts the meter armature and serving to reduce the torque effecting flux upon increase in temperature and to increase the torque effecting flux upon reduction in temperature, to conpensate for temperature effected changes in the dragging action of the damping magnet.

In witness whereof, I hereunto subscribe my name.

JESSE HARRIS.